United States Patent [19]

Covey et al.

[11] 3,940,981

[45] Mar. 2, 1976

[54] PROJECTILE RECOVERY SYSTEM WITH QUICK OPENING VALVES

[75] Inventors: William B. Covey, Long Beach; John R. Mastandrea, Los Angeles; Robert N. Teng, Inglewood, all of Calif.

[73] Assignee: McDonnell Douglas Corporation, Long Beach, Calif.

[22] Filed: Nov. 5, 1973

[21] Appl. No.: 412,990

[52] U.S. Cl. .............................. 73/167; 137/624.18
[51] Int. Cl.² .............................................. G01L 5/14
[58] Field of Search ........................ 73/167, 12, 35; 137/624.18; 188/269, 266; 251/63.5, 326

[56] References Cited
UNITED STATES PATENTS

| | | | |
|---|---|---|---|
| 3,476,358 | 11/1969 | Westerlund et al. | 251/326 |
| 3,718,041 | 2/1973 | Jones et al. | 73/167 |
| 3,741,245 | 6/1973 | West | 251/63.5 |
| R26,279 | 10/1967 | Boynton | 73/12 |

FOREIGN PATENTS OR APPLICATIONS 1,216,701   12/1970   United Kingdom .............. 251/63.5

*Primary Examiner*—Donald O. Woodiel
*Assistant Examiner*—Marcus S. Rasco
*Attorney, Agent, or Firm*—John P. Scholl; Walter J. Jason; Donald L. Royer

[57] ABSTRACT

A projectile recovery system where projectile speed is progressively reduced as the projectile passes through decelerator tubes. These tubes are precharged to high pressure in front of the projectile to minimize the decelerating distance. Quick opening valves, which separate the deceleration tubes and which seal them for pressurization, are opened as the projectile approaches so they will not be struck by the projectile with resulting damage.

5 Claims, 4 Drawing Figures

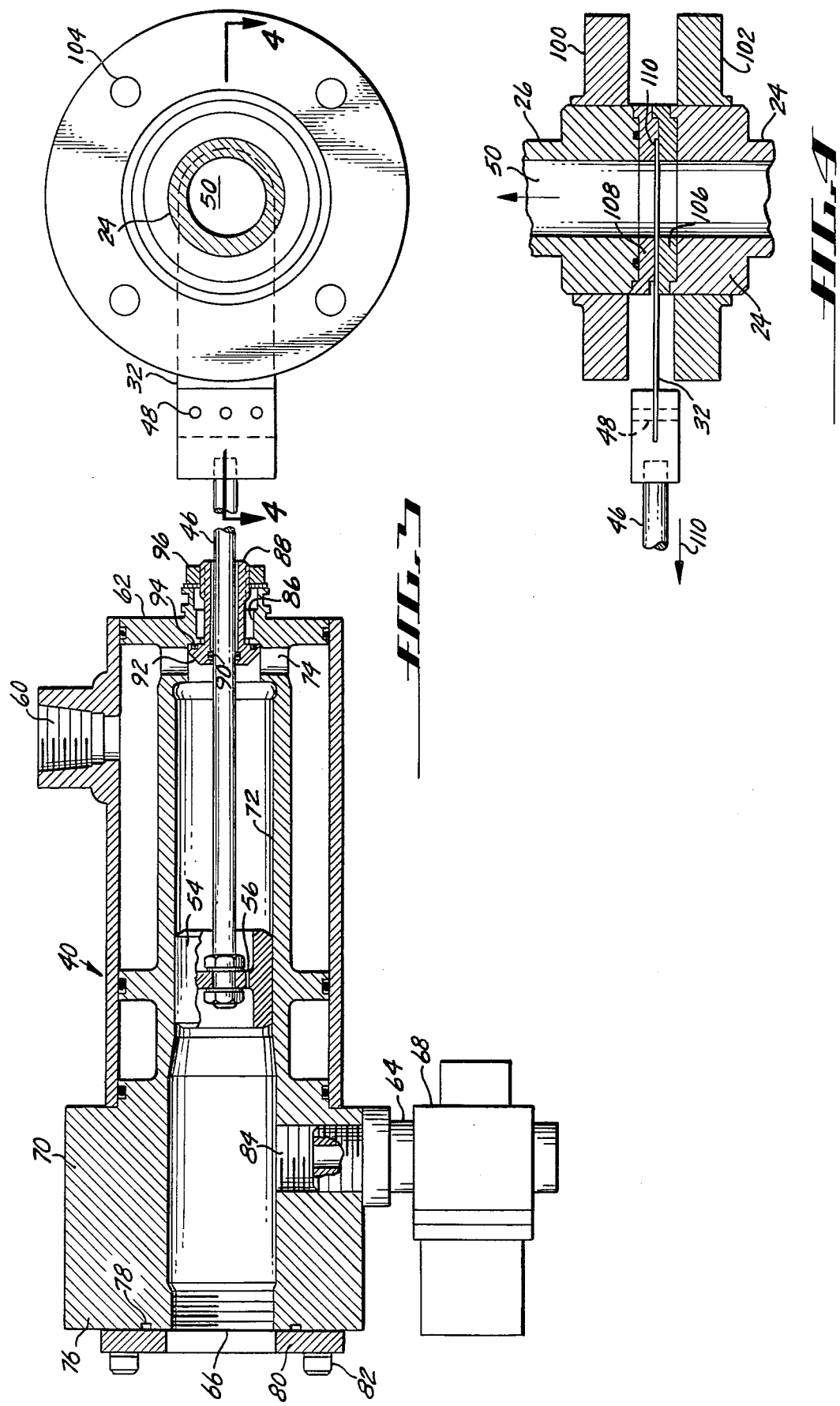

PROJECTILE RECOVERY SYSTEM WITH QUICK OPENING VALVES

The Government has rights to this invention pursuant to Contract No. F40600-72-C-0010 awarded by Department of the Air Force, Arnold Air Force Station, Tennessee 37389.

RELATED INVENTIONS

U.S. Pat. No. 3,678,745 issued July 25, 1972 to Robert N. Teng for a Ballistic Compression Decelerator. It teaches the use of rupturable diaphragms between decelerator tubes. These diaphragms break under pressure buildup in front of the advancing projectile to let the projectile pass to the next deceleration tube. Ultimately the projectile stops undamaged and it may then be analyzed and tested as desired.

BACKGROUND OF THE PRESENT INVENTION

The Ballistic Compression Decelerator of the Teng patent just mentioned involves a projectile with an integral test specimen to be subjected to rain or dust erosion or other environment under consideration during its "flight" downrange. By capturing the specimen without damage through deceleration techniques, it could be examined to determine the effect of the environment upon it.

After the specimen and projectile has been fired and has passed its test environment, it passes through a recovery tube having a series of pressurized compartments. These compartments are sealed with diaphragms which rupture due to the shock wave preceding the projectile. In this manner the projectile does not pierce and break the diaphragm and thus cause damage to the specimen on the nose of the projectile.

In practice, because of the delicate balance of relating projectile speed, shock wave force, frangibility of the diaphragms, and pressure in the compartments, sometimes the projectile would pierce the diaphragm, or strike a piece of the ruptured diaphragm, causing damage to the specimen and thus ruining the test. Because of the expense of the tests and also because of the need for the test information, a more reliable and consistently satisfactory replacement of the diaphragms is needed.

SUMMARY OF THE PRESENT INVENTION

In accordance with the present invention, a projectile with an integral test specimen is launched downrange. The launch gases are relieved when the projectile passes vents for this purpose and the projectile assumes constant free-flight velocity. The projectile continues through a test environment chamber where the test specimen is subjected to the affects of the environment such as erosion by dust, for example. The projectile then enters the shock deceleration tube, a shock precedes the advancing projectile and compresses the air or other gas in the shock deceleration tubes, thereby absorbing kinetic energy and causing the projectile to slow down. A second stage shock decelerator is precharged to a higher pressure than the low pressure shock decelerator and minimizes the decelerating distance. To minimize the recovery tube length, a moderate pressure is maintained in the tube.

The frangible diaphragms formerly used are replaced in the present invention with quick opening valves. The valve actuators are precharged with helium at about 300 psi with the pressure being equal across the piston due to a controlled leak through the piston. At the command signal the electromechanical pilot valve opens and helium rushes out of the actuator through the pilot valve. The unbalanced pressure in the actuator causes the piston to accelerate away from the closed valve position, opening the quick opening valve in front of the approaching test specimen. The pilot valve opens $4 \pm 0.1$ milliseconds after the command signal and the quick opening valve opens $15 \pm 1$ milliseconds after the command signal. The opening time of the quick opening valve is $5 \pm 0.5$ milliseconds from the first motion of the quick opening valve gate to the fully opened position.

BRIEF DESCRIPTION OF THE DRAWINGS

FIG. 3 is a sectional view of the valve and valve actuating system; and

FIG. 4 is a sectional view of the valve taken along the line 4—4 in FIG. 3.

DETAILED DESCRIPTION OF ILLUSTRATIVE EMBODIMENT

Figure 1:
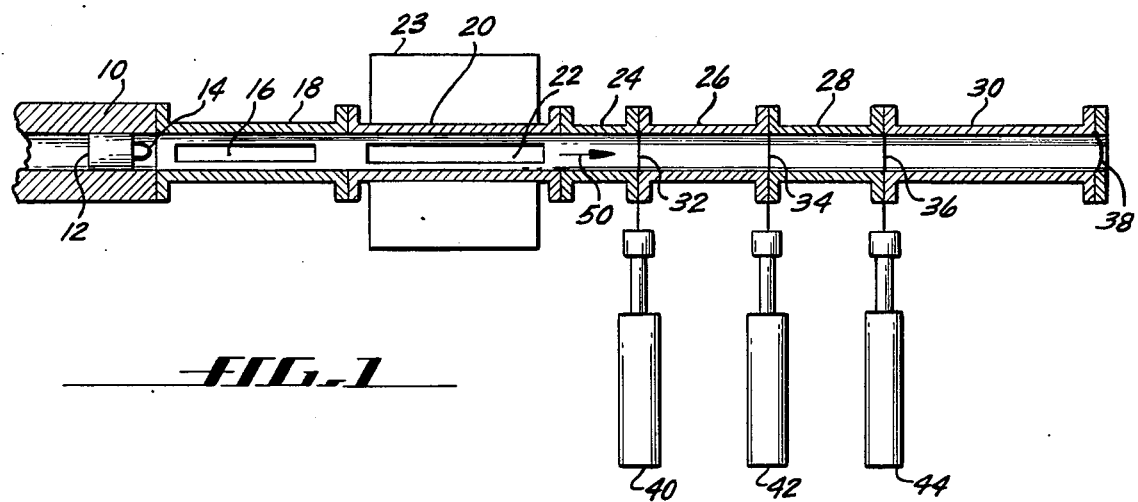
FIG. 1 is a schematic illustration showing the overall test system.

Referring now to the schematic illustration in FIG. 1, there is shown the muzzle 10 of a light-gas gun used to fire and accelerate an integral projectile 12 and test specimen 14. The driving gases expend through vents 16 of tube 18 as the projectile passes it. These vents 16 relieve the launch gases and the test specimen assumes a near constant free-flight velocity as it enters the test environment tube 20. This tube also has vents 22 through which dust, moisture or other test particles pass from chambers 23. One such test chamber for generating dust is described in pending application Ser. No. 246,546, now U.S. Pat. No. 3,817,096 filed Apr. 21, 1972 for Ballistic Range Dust Erosion Apparatus by Irving B. Osofsky to which reference may be had for further information.

After the specimen 14 has passed environmental chamber 23 it enters shock decelerator and recovery tubes 24, 26, 28 and 30. These tubes are connected together and are separated by quick opening valves 32, 34 and 36. Tube 24 is a transition tube which starts the slowing down of the projectile as the shock wave builds up compressed air in front of it. Tube 26 is the first or low pressure tube where additional compressed air in the tube adds to the pressure in front of the projectile. Tube 28 is precharged to a higher pressure and minimizes the decelerating distance. Tube 30 is the last stage decelerator which may be filled with gases or solids to act as a reservoir. A diaphragm 38 over the outer end of tube 30 is acceptable to seal it since the projectile is spent before reaching it.

Valves 32, 34 and 36 across the path of the projectile make tubes 26, 28 and 30 fluid-tight and permit them to be pre-pressurized. By opening these valves just before they are reached by the projectile, the pressurization is there to cause the projectile to slow down. These valves are quick opening valves with a very fast response time. Valve actuators 40, 42 and 44 include electromechanical pilot valves which actuate the valve openings in accordance with command signals. These signals in turn may be pre-programmed or may be generated while the projectile is in flight.

Figure 2:
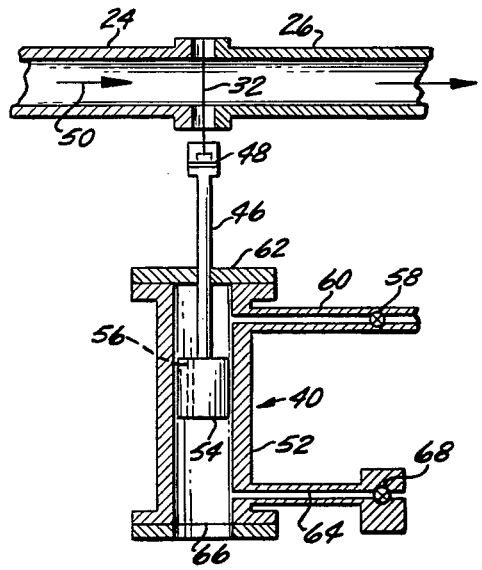
FIG. 2 is an enlarged schematic showing the quick opening valve.

In FIG. 2 there is shown an enlarged schematic of a quick opening valve 32 and valve actuator 40. Valve 32 is a gate between tubes 24 and 26 which, when closed, seals tube 26. This gate is connected to a piston rod 46 through a shear pin 48 and is moved laterally out of the path of the projectile, represented by arrow 50, by actuation of the piston rod 46. Valve actuator 40 has a chamber 52 precharged with helium at 300 psi with the pressure equalized across piston 54 due to a controlled leak through orifice 56 in the piston. The helium is pumped by helium regulator 58 into charge line 60 connected to the chamber 52 between chamber end 62 and piston 54. An exhaust line 64 connects to chamber 52 near its opposite end 66. On command an electromechanical pilot valve 68 in exhaust line 64 opens and helium in that portion of chamber 52 between piston 54 and end 66 rushes out through the valve 68. This unbalance in pressure, thus created, causes piston 54 to move toward end 66, moving gate 32 from the projectile path 50.

End 66 is a Mylar pressure seal that opens on piston impact to permit the piston to fly into a cushion material without damage to the piston.

Pilot valve 68 opens 4 ± 0.1 milliseconds after the command signal and the quick opening valve 34 opens 15 ± 1 milliseconds after the command signal has been given. The opening time of the quick opening valve is 5 ± 0.5 milliseconds from the first motion of the gate to its fullyopen position.

It should be understood that any number of tubes with quick opening valves may be used as desired, depending upon the projectile velocity, specimen material, environmental test, and pressurization of the tubes.

Referring now to FIG. 3 there is shown an illustrative embodiment of quick opening valve 32 and valve actuator 40. Actuator 40 has a body portion 70 having a central bore 72 along which piston head 54 is adapted to move. As shown in FIG. 3, this bore has radial openings 74 at its inner end 62 to permit fluid passage from charge line opening 60 for pressurization purposes. The outer end 76 of body portion 70 has a Mylar diaphragm over the bore opening. Sealing is provided with an O-ring 78 on the underside and a retainer ring 80 held with fasteners 82 on the topside. Bore 72 has an opening 84 communicating with exhaust line 64, the end of which is closure-actuated by an electromechanical pilot valve 68. Inner end 62 has an opening 86 with a bushing 88 therein adapted to receive piston rod 46 in sliding engagement. Seal 90 in bushing 86 prevents escape of pressurization fluids or gases. Bushing 86 has an inner collar 92 which bears against the inside of chamber end 62 with an O-ring seal 94 in between. The outer end 96 of bushing 86 is threaded and nut 98 secures it in place.

Piston head 54 is attached to piston rod 46 and, when there is a pressure differential with the cylinder bore 72 such as when electromagnetic valve 68 opens to vent pressure from the upper end, moves the rod 46 outwardly or to the left in FIG. 3. The outer end of piston rod 46 is connected to the quick opening valve gate 32 which is adapted to cover projectile path 50 between tubes 24 and 26.

As shown in FIG. 3 and FIG. 4 each tube 24, 26 has flanges 100, 102 having apertures 104 for fastening them together. An upstream plate 106 and downstream plate 108 fit in between and have a slot 110 to receive quick opening valve gate 32. When the gate is in the slot, as shown, the tubes may be pressurized prior to the projectile firing. As previously mentioned, movement of piston rod 46 to the left, as shown by arrow 110, moves the gate 32 out of the way of the advancing projectile.

Having thus described an illustrative embodiment of the present invention, it is to be understood that modifications thereof will become apparent to those skilled in the art and that these deviations are to be construed as part of the present invention.

We claim:
1. A projectile recovery system with quick opening valves comprising:
   a plurality of tubes connected together to form a path through which a fired projectile passes,
   quick opening valve gates having a first position across said path to close the tubes for pressurization, and a second position out of said path to permit passage of said projectile into pressurized tubes without striking said gates, and
   valve actuator means responsive to controlled signals applied thereto for sequentially moving therefor, said valve gates from their first position to their second position.

2. A projectile recovery system with quick opening valves as set forth in claim 1 wherein said tubes have a transverse slit adapted to receive one of said valve gates in its first position and to permit its withdrawal to its second position.

3. A projectile recovery system with quick opening valves as set forth in claim 1 wherein said valve actuator means comprises a fluid actuated cylinder having a bore with a fluid inlet charge line at one end and a fluid outlet exhaust line at its other end, a piston head in said bore having an orifice therein to equalize pressure on both sides of said head, and a pilot valve in said fluid outlet exhaust line operable to release pressure therein.

4. A projectile recovery system with quick opening valves as set forth in claim 3 wherein said pilot valve is actuated by electromechanical means responsive to control signals applied thereto.

5. A projectile recovery system with quick opening valves as set forth in claim 3 wherein the outer end of said bore is covered with a rupturable diaphragm sealing said bore for pressurization until said pilot valve releases said pressure, said rupturable diaphragm absorbing forces from said piston head without damage to said head.

* * * * *

UNITED STATES PATENT OFFICE
CERTIFICATE OF CORRECTION

PATENT NO. : 3,940,981
DATED : 2 March 1976
INVENTOR(S) : William B. Covey, John R. Mastandrea, Robert N. Teng It is certified that error appears in the above-identified patent and that said Letters Patent are hereby corrected as shown below:

In Column 4, Line 31, delete "therefor".

Signed and Sealed this twenty-second Day of June 1976

[SEAL]

Attest:

RUTH C. MASON
Attesting Officer

C. MARSHALL DANN
Commissioner of Patents and Trademarks